United States Patent Office 2,861,042
Patented Nov. 18, 1958

2,861,042

EMULSION FLUID FOR WELLS

Thomas E. Watkins, Arlington, Tex., assignor, by mesne assignments, to Socony Mobil Oil Company, Inc., New York, N. Y., a corporation of New York No Drawing. Application August 15, 1955
Serial No. 528,540

13 Claims. (Cl. 252—8.5)

This invention relates to emulsions and relates more particularly to emulsions for use in wells.

In the drilling or in the treatment of wells, fluids find important use. For example, in the rotary drilling of wells, such as those for petroleum oil or gas, a drilling fluid is continuously circulated from the surface of the ground to the bottom of the well bore hole and back to the surface of the ground again. The drilling fluid has various functions including those of lubricating the drill bit and pipe, carrying cuttings from the bottom of the well bore hole to the surface of the ground, and imposing a hydrostatic head on the drilled formations to prevent escape of oil, gas, or water therefrom into the well bore hole during the drilling operations. Ordinarily, aqueous drilling fluids comprising a suspension of a clay in water are employed. Aqueous drilling fluids are limited in the extent to which their specific gravities can be reduced and, where reduced specific gravities are required, drilling fluids having a fluid phase consisting entirely of oil or consisting of an emulsion of oil and water can be used.

Emulsion drilling fluids are less expensive and are more convenient to handle than drilling fluids having a fluid phase consisting entirely of oil. Therefore, of these two types, the emulsion drilling fluids are usually preferred. Oil-in-water emulsion drilling fluids have been used extensively. In these drilling fluids, water is the continuous phase of the emulsion. However, oil-in-water emulsion drilling fluids, in common with aqueous drilling fluids, have been recognized to damage oil-producing formations by reason of filtration of water from the fluid into the formation with consequent reduction in permeability of the formation and reduced rate of oil production. To avoid the damage to the formation arising from the use of aqueous and oil-in-water emulsion drilling fluids and yet retain advantages of the oil-in-water and the drilling fluids whose fluid phase consists entirely of oil, the use of water-in-oil emulsion drilling fluids has been proposed.

In the formulation of water-in-oil emulsion drilling fluids, tall oil has been employed as an emulsifying agent. However, when employing tall oil as the emulsifying agent, an excessive amount of agitation of the oil and water is required to obtain emulsification. Further, the emulsion tends to flow readily through permeable media, such as permeable earth formations or the filter cake formed on the walls of the well bore hole during drilling. A measure of correction of this latter property, known as filter loss, along with a reduction in the amount of agitation required to effect emulsification, is effected employing blown, or oxidized, tall oil. While the use of blown tall oil provides an improvement over the use of the untreated form, nevertheless, the blown tall oils heretofore employed have left much to be desired particularly in connection with the stability and filter loss of the emulsion drilling fluid when the fluid is subjected to salt contamination.

It is an object of this invention to provide a water-in-oil emulsion drilling fluid. It is another object of this invention to provide an emulsifying agent for water-in-oil emulsion drilling fluid. It is another object of this invention to provide a method for preparing an emulsifying agent for water-in-oil emulsion drilling fluid. It is another object of this invention to improve the stability and filter loss of water-in-oil emulsion drilling fluid. It is another object of this invention to reduce the effect of salt contamination on water-in-oil emulsion drilling fluid. It is another object of this invention to provide a method for converting aqueous drilling fluid to water-in-oil emulsion drilling fluid. It is another object of this invention to provide a fluid for use in completing a well in an oil-producing earth formation. It is another object of this invention to provide a well treating fluid. These and other objects of the invention will become apparent from the following detailed description.

In accordance with the invention, tall oil is subjected to the action of oxygen for such time and at such temperatures that its viscosity measured in centipoises at 200° F. has increased to between 125 and 250 percent of the original value. Thereafter, the resulting product is admixed with oil and water to produce a water-in-oil emulsion.

The water-in-oil emulsion containing the tall oil subjected to the action of oxygen for such time and at such temperatures that its viscosity measured in centipoises at 200° F. has increased to between 125 and 250 percent of the original value can be employed for the treatment of an oil-producing subterranean formation. However, the emulsion has specific and preferred use in a well bore hole during mechanical penetration of an oil-producing subterranean formation. In a more restricted sense, the emulsion is preferably employed as a drilling fluid. In another sense, the emulsion is employed as a completion fluid.

Subjection of the tall oil to the action of oxygen is believed to be essentially an oxidation procedure resulting in polymerization of unsaturated compounds in the tall oil. However, subjection of the tall oil to the action of oxygen for such time and temperatures that its viscosity measured in centipoises at 200° F. has increased to between 125 and 250 percent of the original value is not a complete oxidation. Rather, it is only a partial oxidation. With increase in the extent of oxidation, the viscosity of the tall oil increases. Thus, the increase in the viscosity of the tall oil is a measure of the extent of oxidation of the tall oil.

I have found that subjecting tall oil to the action of oxygen for such time and at such temperatures that its viscosity measured in centipoises at 200° F. has increased to between 125 and 250 percent of the original value provides a product which in an oil and water emulsion imparts to the emulsion a low filter loss along with high stability in the presence of salt. By the oxidation procedure, the tall oil is so affected that water-in-oil emulsion containing this material has a low filter loss. However, by restricting the treatment of the tall oil with oxygen for such time and at such temperatures that its viscosity measured in centipoises at 200° F. has increased to between 125 and 250 percent of the original value, the emulsion is provided with the additional property of maintaining a high degree of stability in the presence of salt.

The tall oil is subjected to the action of the oxygen for any combination of times and temperatures that will result in increase of its viscosity from the viscosity prior to subjection to the action of the oxygen to a viscosity greater than 125 percent of this original value but not greater than 250 percent of this original value. The viscosity increase is the viscosity increase as measured in centipoises with the tall oil at 200° F. With increase in the temperature of the tall oil during subjection to the action of the oxygen, the time required to obtain the desired viscosity increase is decreased. Temperatures employed may vary between about 175° F. and 300° F. Preferably, the temperatures employed should be between about 200° F. and 250° F. The time during which the tall oil is subjected to the action of the oxygen may be between about 8 hours and 30 hours. Preferably, this time should be between about 16 hours and 24 hours. However, variations in these times and temperatures may occur depending upon the ratio of oxygen to tall oil employed, the efficiency of contact of oxygen and the tall oil, and other factors.

Subjection of the tall oil to the action of oxygen is effected, as indicated, by contacting the tall oil with oxygen. Efficiency of contact is increased by increasing intimacy of contact. As the source of oxygen, it is preferred, because of economy, to employ air.

Various procedures may be employed for effecting contact of the tall oil with oxygen. For example, the tall oil may be subjected to the oxygen by blowing oxygen or air or other gaseous mixture containing oxygen through the tall oil. This may be effected by bubbling the gas upwardly through a stationary body of the tall oil. Thus, air or other oxygen-containing gas may be bubbled through a body of tall oil contained in a tank or other suitable vessel. Blowing of oxygen through the tall oil may also be effected by passing the oxygen upwardly through a downwardly flowing body of tall oil. This latter procedure may be effected in a packed column, bubble cap tower, perforated plate tower, cascade tower, or other suitable type of device for contacting gas and liquid. Various other procedures for subjecting the tall oil to the action of the oxygen will suggest themselves to those skilled in the art.

During the time the tall oil is subjected to the action of the oxygen, localized temperatures higher than 300° F. and lower than 175° F. are permissible. However, localized temperatures higher than 300° F. should be kept at a minimum. Localized temperatures sufficiently high to cause charring of the tall oil should, of course, be avoided.

Maintenance of the desired temperature may be effected by cooling the oxygen, the tall oil, or both the oxygen and the tall oil. Where the oxygen is bubbled through a stationary body of the tall oil, the body of tall oil may be cooled by indirect heat transfer through cooling coils, for example. The tall oil may also be cooled by cooling the oxygen prior to bubbling through the tall oil. Both procedures may be employed, as indicated. Where an upwardly flowing stream of oxygen is contacted with a downwardly flowing stream of tall oil, either or both of the oil and the oxygen may be cooled prior to contact. Generally, any suitable procedure for maintaining the desired temperature may be employed.

The tall oil subjected to the action of oxygen for such time and at such temperatures that its viscosity measured in centipoises at 200° F. has increased to between 125 and 250 percent of the original value is admixed with oil and water to provide water-in-oil emulsion. The continuous phase of the emulsion is oil and the discontinuous phase is water. The oil employed as the continuous phase of the emulsion may be any oil heretofore employed or otherwise suitable for use in emulsion drilling fluids. The oil may be a mineral or hydrocarbon oil such as petroleum crude oil, diesel oil, fuel oil, gas oil, and the like. The oil may also be an animal or vegetable oil. However, minerals oils are to be preferred because of availability and economy. The oil phase constitutes between about 20 percent and 85 percent by volume of the emulsion. By virtue of the fact that the oil phase may constitute as high as about 85 percent by volume of the emulsion, the emulsion may have a low density as compared with aqueous drilling fluid. It will be understood, however, that the volume of oil with respect to the volume of water in the emulsion may vary depending upon the use to which the emulsion is put and the properties desired for the effects to be achieved.

The tall oil subjected to the action of the oxygen may be added to the water and oil in admixture with each other. However, the tall oil may be added to a portion or all of the water or to a portion or all of the oil or to a portion or all of both prior to admixture with each other. Preferably, however, the tall oil is added to a portion or all of the oil and the oil containing the tall oil is thereafter admixed with water. If desired, the tall oil subjected to the action of the oxygen may be upon addition to the water or oil or both in the form of a metallic salt or soap. Additionally, the water or oil or both may contain a salt which by reaction with the tall oil will convert it to the form of a metallic salt or soap. This salt may be a calcium salt, to which reference will be made later. Hereinafter, reference to tall oil subjected to the action of oxygen shall be intended to include the metallic salt or soap of the tall oil.

In the emulsion, the amount of tall oil subjected to the action of the oxygen may be between 12 and 20 pounds per barrel of emulsion. By barrel is meant a 42 gallon barrel. Preferably, the amount of tall oil should be about 15 pounds per barrel. Amounts less than 12 and more than 20 pounds per barrel of emulsion may be employed, if desired. However, it is preferred not to use amounts too far below about 12 pounds per barrel since, as it has been found, emulsions with low concentrations of the tall oil exhibit a tendency toward filter loss. On the other hand, emulsions containing excessive amounts of the tall oil tend to become undesirably high in viscosity.

In accordance with a feature of the invention, the tall oil subjected to the action of the oxygen may be in admixture with another material at the time it is added to the oil, water, or mixture of oil and water. This other material may be, for example, a material desirably present in the water-in-oil emulsion. This other material, further, may be a liquid or a solid.

Water-in-oil emulsions employed for the treatment of wells, particularly water-in-oil emulsion drilling fluids, often contain solid materials suspended in the emulsion. These materials may have various functions including those of imparting viscometric or thixotropic properties or both to the emulsion, increasing the specific gravity of the emulsion, or providing a filter cake on the walls of the bore hole to reduce or prevent lost circulation, or loss of the emulsion, into porous earth formations. The tall oil subjected to the action of the oxygen may be admixed with any of these solid materials employed in emulsion fluids for the treatment of wells and the mixture of the tall oil and the solid material thereafter added to the water or oil or mixture of both. In accordance with a preferred embodiment of the invention, the mixture of tall oil subjected to the action of the oxygen is in the form of a dry mix with a solid material. As a dry mix with a solid material, the tall oil subjected to the action of the oxygen is in a particularly advantageous form from the standpoint of being marketable and free of the difficulties involved in the packaging, handling, and transporting of the normally liquid tall oil.

Where it is desired to produce a dry mix of the tall oil subjected to the action of oxygen, the solid material employed should be a porous material. By porous material, I mean a solid material containing pores or interstices. Such materials include diatomaceous earth or kieselguhr, popped perlite, pumice, activated alumina, activated silica, zeolite, other clay minerals, charcoal, and sawdust. Of these, it is preferred to employ diatomaceous earth or popped perlite.

The maximum amount of the tall oil to be employed in the dry mix is such that the surfaces of the particles of the porous solid are sufficiently free of liquid that they will not adhere under gravitational forces pulling them apart. With such amounts of the tall oil, the dry mix will remain free flowing. This maximum amount will vary with the shape and size of the particles of the solid porous material. With such shapes as spheres, the particles of the porous solid have small areas of contact. With increase in the size of the particles, a greater amount of the tall oil may also be employed. The maximum amount will also vary with the density and the porosity of the porous solid and to some extent with the type of porous solid. With increase in density and porosity, a greater amount of the tall oil may be employed. Accordingly, a general rule as to the maximum amount of the tall oil in the dry mix cannot be given. However, the maximum amount that may be employed in any particular case can be determined by increasing the ratio of tall oil to porous solid until a product is obtained whose individual particles would adhere with a small increase in the ratio. Generally, an amount of the tall oil between about 10 and 100 percent by weight of the porous solid may be employed, although greater or lesser amounts may be employed.

It is preferred in the dry mix that the tall oil be impregnated in the particles of porous solid. Impregnation of the porous solid with the tall oil may be effected in any desired manner. The tall oil, prior to impregnation, or the porous material may be heated, if desired, to facilitate impregnation. Heating of the tall oil, where heating is employed, may be of the order of 140° F. to 212° F. Impregnation may be effected by spraying, for example. In the spraying operation, any known mode of procedure for this purpose may be employed. The porous solid may be spread out in a thin layer, such as on a conveyor belt, and the tall oil sprayed on the porous solid. If desired, the tall oil may be sprayed upon a substantially deep body of porous solid and the surface of the body renewed either continuously or intermittently as desired by suitable agitating means during spraying. Alternately, the tall oil may be added to the porous solid and the mixture tumbled, kneaded, or otherwise agitated until a satisfactorily uniform distribution of the tall oil and the porous solid is obtained. The tall oil may be dissolved in a suitable solvent if desired prior to impregnation in the porous solid. Impregnation of the porous solid may then be effected employing the solution of tall oil. The solvent employed is preferably a solvent that may be removed from the porous solid by evaporation. Otherwise, the solvent must be employed in amounts that will, along with the tall oil, be insufficient to cause the particles of the porous solid to adhere under gravitational forces pulling them apart and have no undesired effect otherwise on the dry mix.

Other materials desirably present in the emulsion are those which will have a desired effect when the tall oil is in admixture with the oil and water. Included among these materials are those which improve the properties of the oil and water mixture from the standpoint of ease of emulsification. Such materials are those that have mutual solubility in oil and water. A particularly effective material for admixture with tall oil subjected to the action of oxygen, from the standpoint of effect on water-in-oil emulsion is a quaternary amine. These amines have the formula:

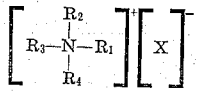

wherein $R_1$, $R_2$, $R_3$, and $R_4$ are organic radicals and X is an anion. Each of $R_1$, $R_2$, $R_3$, and $R_4$ may be the same organic radical or may be different organic radicals. The organic radicals may be saturated or unsaturated and may be alkyl, aryl, aralkyl, or alkaryl radicals. The organic radicals may consist entirely of carbon and hydrogen or may consist of carbon and hydrogen along with oxygen, sulfur, nitrogen, phosphorous, halogen, or other metallic or non-metallic element. The anion may be any anion capable of satisfying the fifth valence of the nitrogen. These anions include the hydroxide, sulfate, nitrate, chloride, bromide, iodide, fluoride, carbonate, bicarbonate, phosphate, acetate, formate, propionate, and others. Quaternary amines which may be employed include tetramethyl ammonium chloride, tetraethyl ammonium chloride, tetrapropyl ammonium chloride, trimethyl monoethyl ammonium bromide, dimethyl diethyl ammonium iodide, dimethyl didodecyl ammonium chloride, trimethyl monododecyl ammonium chloride, trimethyl monotetradecyl ammonium chloride, trimethyl monohexadecyl ammonium chloride, trimethyl monooctadecyl ammonium chloride, dimethyl ditetradecyl ammonium chloride, dimethyl dihexadecyl ammonium chloride, dimethyl dioctadecyl ammonium chloride, etc. A preferred quaternary amine is dimethyl didodecyl ammonium chloride.

I have found that the addition of the quaternary amine to the emulsion containing oil, water, and emulsifying agent imparts improved properties to the emulsion. The filter loss of the emulsion, for example, is reduced. Further, the stability of the emulsion is increased. In the preparation of the emulsion, the addition of the quaternary amine reduces the time and the degree of agitation required for dispersion of the discontinuous phase. The amount of quaternary amine employed may be between about 0.1 and 1.0 pound per barrel of emulsion although greater and lesser amounts may be employed as desired.

If desired, these other materials desirably present in the emulsion may be, prior to inclusion in the emulsion, admixed with the tall oil subjected to the action of oxygen. These other materials may also be contained in a dry mix of a porous solid material and the tall oil. Thus, a mixture, which may be in the dry state, is provided for use in the preparation of water-in-oil emulsion. An example of a mixture in the dry state contains tall oil subjected to the action of oxygen, diatomaceous earth, and quaternary amine such as dimethyl didodecyl ammonium chloride. In this mixture the ratio by weight of these materials are 15:10:0.1, respectively. In place of the diatomaceous earth, popped perlite may be used.

It is preferred that the emulsion fluid contain calcium ion. For example, the emulsion fluid preferably contains calcium chloride which imparts stabilizing properties to the emulsion. Where the tall oil subjected to the action of oxygen is in the form of a dry mix with a porous solid, the calcium chloride may also be incorporated in the dry mix. The calcium chloride may be dissolved in water and impregnated on the porous solid material in the same manner as the tall oil subjected to the action of the oxygen. This impregnation may be effected prior or subsequent to impregnation with the tall oil subject to the action of oxygen. The calcium chloride may be also added to the porous solid material in the dry state prior or subsequent to impregnation with the tall oil subjected to the action of oxygen and the mixture tumbled or otherwise agitated to obtain uniform mixing. Lime is also preferably employed to impart desirable properties of stabilization to the emulsion fluid. The lime may also be incorporated in the dry mix.

Calcium chloride employed in the emulsion is preferably in the amount of at least five pounds per barrel of the emulsion. Where lime is employed, it also is preferably in the amount of five pounds per barrel of the emulsion. Where calcium chloride or lime is employed in the dry mix, the amounts of each may be between 25 and 100 parts per 100 parts of porous solid material although larger and smaller amounts may be employed if desired.

Additional other materials advantageous from the standpoint of improving the properties of the emulsion or otherwise may be added to the dry mix containing the tall oil subjected to the action of the oxygen. Where liquid materials are added to the impregnated porous solid, the amounts thereof including the amount of the tall oil and any non-volatile solvents therefor must be such that the particles of porous solid remain in a free flowing condition. If desired, the addition of the other materials may be effected simultaneously with addition of the tall oil. For example, quaternary amine may be admixed with the tall oil and the mixture, with or without solvent, added to the porous solid.

The tall oil subjected to the action of oxygen may be employed for the conversion of an aqueous, oil, or oil-in-water emulsion fluid used in the treatment of wells, such as a drilling fluid, to a water-in-oil emulsion. For example, an aqueous drilling fluid may be employed in the drilling of a well until a particular formation is reached which desirably is to be drilled with a water-in-oil emulsion drilling fluid. In this case, the tall oil subjected to the action of the oxygen may be admixed with oil and the aqueous drilling fluid. The aqueous drilling fluid may be a fresh water drilling fluid, salt water drilling fluid, lime base drilling fluid, calcium treated drilling fluid, or other aqueous drilling fluid. Where a drilling fluid whose liquid phase consists substantially entirely of an oil is to be converted to a water-in-oil emulsion drilling fluid, the tall oil subjected to the action of the oxygen may be admixed with the drilling fluid and water, or aqueous drilling fluid is added to the mixture in place of all or part of the water.

Where the tall oil subjected to the action of oxygen is admixed with a porous solid to produce a dry mix, emulsion fluid for the treatment of a well is prepared by mixing oil, water, and the dry mix.

The following examples will be illustrative of the invention.

EXAMPLE 1

In this example, samples of tall oil were subjected to the action of oxygen for various periods of time at various temperatures. In each case, the oxygenation was carried out by blowing air through the sample of the tall oil contained within an open vessel. The viscosity of each of the samples of the tall oil prior to subjection to the action of oxygen and subsequent to the action of oxygen were measured.

Following oxygenation, each of the samples of tall oil was employed as a component of a water-in-oil emulsion drilling fluid. Each drilling fluid had the following composition:

| Component | Amount |
| --- | --- |
| Diesel oil | 45 volume percent. |
| Water | 45 volume percent. |
| Calcium chloride | 10 lb./bbl. |
| Lime | 10 lb./bbl. |
| Sodium hydroxide | 1 lb./bbl. |
| Tall oil subjected to the action of oxygen | 20 lb./bbl. |

In each case, the drilling fluid was prepared by admixing the diesel oil with the calcium chloride and then adding the lime. To this mixture was added the tall oil subjected to the action of oxygen. The caustic soda was then added followed by the water.

Following preparation of the emulsion drilling fluids, each was stirred at room temperature for a period of one-half hour. A portion of each of these samples was aged at a temperature of 350° F. for 16 hours after which time the stability and filter loss of the portions were measured. Another portion of each of these samples was contaminated with salt water by admixing therewith 10 volume percent of water saturated with sodium chloride, i. e., containing about 260,000 parts per million by weight of sodium chloride. There was also added to each of these portions 10 volume percent of diesel oil. Each of these portions was aged at a temperature of 350° F. for 16 hours after which time the stability and filter loss of the portions were measured.

Stability of the emulsions was measured by immersing electrodes one-eighth inch apart in the emulsions and determining the voltage required to obtain flow of electrical current through the emulsion between the electrodes. With increasing stability of the emulsion, a greater voltage is required to cause current to flow between the electrodes. Accordingly, with this method the stability can be expressed as the voltage required to cause current flow between the electrodes.

Filter loss was determined in accordance with the standard 30-minute API filter loss test.

The following table gives the results obtained.

Table

| Sample No | 1 | 2 | 3 |
| --- | --- | --- | --- |
| Viscosity at 200° F. subsequent to oxygenation—centipoises | 85 | 98 | 3,700 |
| Percentage of original viscosity value | 130 | 148 | 5,600 |
| Properties of emulsion aged at 350° F. for 16 hours: | | | |
| Stability—Volts | 260 | 270 | 280 |
| Filter Loss—cubic centimeters | 0.0 | 0.0 | 0.3 |
| Properties of emulsion admixed with saturated salt water and oil and aged at 350° F. for 16 hours: | | | |
| Stability—Volts | 210 | 330 | 270 |
| Filter Loss—cubic centimeters | 0.3 | 0.3 | 13.0 |

It will be observed from the table that the emulsions prepared with the tall oils subjected to the action of oxygen such that their viscosities at 200° F. were increased to 130 and 148 percent of the original value had, after aging at 350° F. for 16 hours, stabilities of 260 and 270 volts, respectively, and filter losses of zero. The emulsion prepared with the tall oil subjected to the action of oxygen such that its viscosity at 200° F. was increased to 5600 percent of the original value also had a satisfactory stability and filter loss, namely, 280 volts and 0.3 cubic centimeter, respectively. Further, it will be seen that the emulsions prepared with the tall oil which had been subjected to the action of oxygen such that their viscosities were increased to 130 and 148 percent of the original value had, after contamination with salt water and aging for 16 hours, stabilities of 210 and 330 volts, respectively, and filter losses of zero. On the other hand, while, under the same conditions, the stability of the emulsion prepared from the tall oil which had been subjected to the action of oxygen such that its viscosity was increased to 5600 percent of the original value was satisfactory, the filter loss was 13.0 cubic centimeters.

EXAMPLE 2

In this example, tall oil was subjected to the action of oxygen by blowing air therethrough until the viscosity of the tall oil measured at 200° F. had increased from 66 centipoises to 98 centipoises, an increase to 148 percent of the original value. Thereafter, this oxygenated tall oil was admixed with oil and water to form an emulsion drilling fluid. This emulsion drilling fluid was formed by first admixing diesel oil with calcium chloride. To the mixture was then added calcium hydroxide and thereafter the tall oil was added to the mixture. Next, sodium hydroxide was added and with the mixture was stirred a water-base drilling fluid containing clay. Finally, there was added to the mixture dimethyl didodecyl ammonium chloride. The composition of this mixture was as follows:

| Component | Amount |
| --- | --- |
| Diesel oil | 45 volume percent. |
| Water base drilling fluid | 45 volume percent. |
| Calcium chloride | 10 lb./bbl. |
| Lime | 10 lb./bbl. |
| Sodium hydroxide | 1 lb./bbl. |
| Oxygenated tall oil | 15 lb./bbl. |
| Quaternary ammonium salt | ½ lb./bbl. |

The mixture was stirred for a period of 30 minutes and thereafter aged at 350° F. for 16 hours. Following the aging period, the stability and the filter loss of the emulsion were measured. The stability was 350 volts and the filter loss was zero.

EXAMPLE 3

In this example, tall oil subjected to the action of oxygen by blowing air therethrough until its viscosity measured at 200° F. had increased from 66 centipoises to 98 centipoises, an increase of 148 percent of the original value, was admixed with popped perlite to form a dry mix. Prior to admixing with the tall oil subjected to the action of oxygen, the popped perlite was admixed with calcium chloride in the weight ratio of 1:1. The tall oil subjected to the action of the oxygen was heated to a temperature of 80° C. and sprayed upon the mixture of popped perlite and calcium chloride in the amount of ¾ per part of mixture of popped perlite and calcium chloride. During the spraying, the mixture was agitated vigorously to obtain a uniform deposition of oil. Thereafter, to the dried mixture was added lime in the amount of 1 part per 1 part calcium chloride and quaternary amine in the amount of 1 part per 20 parts calcium chloride. The quaternary amine was dimethyl didodecyl ammonium chloride.

The resulting mixture was a free flowing solid and exhibited no tendency to stick to the walls of a glass container. The mixture was added to oil and water in the amount of 45.5 pounds per barrel. The resulting emulsion drilling fluid had a stability of 250 volts and a zero filter loss.

EXAMPLE 4

In this example, tall oil which had been subjected to the action of oxygen by blowing air therethrough for such time and temperature that its viscosity measured at 200° F. had increased from 66 centipoises to 98 centipoises, an increase of 148 percent of the original value, was heated in a container. To the container was added diatomaceous earth in the ratio of 15 pounds of tall oil to 10 pounds of diatomaceous earth. The mixture was stirred and calcium chloride and lime were added thereto in the amounts of 1 pound of each to 1 pound of the diatomaceous earth. Thereafter, there was added quaternary amine in the amount of 0.5 pound for each pound of diatomaceous earth. This quaternary amine was dimethyl didodecyl ammonium chloride. The resulting material was a free flowing solid and exhibited no tendency to adhere to the walls of a glass container. The product was light gray-beige in color.

This dry mixture was employed for the preparation of an emulsion drilling fluid. The dry material was added to a mixture of oil and water. The oil and water was in the volume ratio of 50:50 and the dry mix was added thereto in the amount of 45.5 pounds per barrel of combined liquid and solids. The emulsion fluid formed had a stability of 90 volts after one minute of stirring. The stability increased as stirring was continued. The filter loss of this mixture was zero.

Having thus described my invention, it will be understood that such description has been given by way of illustration and example and not by way of limitation, reference for the latter purpose being had to the appended claims.

I claim:

1. A fluid for the treatment of a well comprising a water-in-oil emulsion containing as an emulsifying agent tall oil which has been subjected to the action of oxygen for such time and at such temperatures that its viscosity measured in centipoises at 200° F. has increased to between 125 and 250 percent of the original value.

2. A fluid for the treatment of a well comprising a water-in-oil emulsion containing as an emulsifying agent tall oil which has been subjected to the action of oxygen for such time and at such temperatures that its viscosity measured in centipoises at 200° F. has increased to between 125 and 250 percent of the original value and containing a quaternary amine.

3. In the process of drilling a well the step comprising circulating in said well a water-in-oil emulsion drilling fluid prepared by admixing oil and water and as an emulsifying agent tall oil which has been subjected to the action of oxygen for such time and at such temperatures that its viscosity measured in centipoises at 200° F. has increased to between 125 and 250 percent of the original value.

4. In the process of drilling a well the step comprising circulating in said well a water-in-oil emulsion drilling fluid prepared by admixing oil and water and as an emulsifying agent tall oil which has been subjected to the action of oxygen for such time and at such temperatures that its viscosity measured in centipoises at 200° F. has increased to between 125 and 250 percent of the original value and a quaternary amine in an amount sufficient to decrease the time and degree of agitation required for dispersion of said water in said oil.

5. In the process of drilling a well the step comprising circulating in said well a water-in-oil emulsion drilling fluid prepared by admixing oil and water and as an emulsifying agent tall oil which has been subjected to the action of oxygen for such time and at such temperatures that its viscosity measured in centipoises at 200° F. has increased to between 125 and 250 percent of the original value and a quaternary amine in an amount between about 0.1 and 1.0 pound per barrel of said water-in-oil emulsion drilling fluid.

6. In the process of drilling a well the step comprising circulating in said well a water-in-oil emulsion drilling fluid prepared by admixing oil and water and as an emulsifying agent tall oil which has been subjected to the action of oxygen for such time and at such temperatures that its viscosity measured in centipoises at 200° F. has increased to between 125 and 250 percent of the original value and in an amount sufficient to stabilize said water-in-oil emulsion drilling fluid compound capable of yielding calcium ion.

7. In the process of drilling a well the step comprising circulating in said well a water-in-oil emulsion drilling fluid prepared by admixing oil and water and as an emulsifying agent tall oil which has been subjected to the action of oxygen for such time and at such temperatures that its viscosity measured in centipoises at 200° F. has increased to between 125 and 250 percent of the original value and in an amount of at least 5 pounds per barrel of said water-in-oil emulsion drilling fluid a compound capable of yielding calcium ion.

8. In the process of drilling a well the step comprising circulating in said well a water-in-oil emulsion drilling fluid prepared by admixing oil and water and as an emulsifying agent tall oil which has been subjected to the action of oxygen for such time and at such temperatures that its viscosity measured in centipoises at 200° F. has increased to between 125 and 250 percent of the original value and lime in an amount sufficient to stabilize said water-in-oil emulsion drilling fluid.

9. In the process of drilling a well the step comprising circulating in said well a water-in-oil emulsion drilling fluid prepared by admixing oil and water and as an emulsifying agent tall oil which has been subjected to the action of oxygen for such time and at such temperatures that its viscosity measured in centipoises at 200° F. has increased to between 125 and 250 percent of the original value and a quaternary amine in an amount sufficient to decrease the time and degree of agitation required for dispersion of said water in said oil and lime in an amount sufficient to stabilize said water-in-oil emulsion drilling fluid.

10. In the process of drilling a well the step comprising circulating in said well a water-in-oil emulsion drilling fluid prepared by admixing oil and water and as an emulsifying agent tall oil which has been subjected to the action of oxygen for such time and at such temperatures that its viscosity measured in centipoises at 200° F. has increased to between 125 and 250 percent of the original value and a quaternary amine in an amount between about 0.1 and 1.0 pound per barrel of said water-in-oil emulsion drilling fluid and lime in an amount of at least 5 pounds per barrel of said water-in-oil emulsion drilling fluid.

11. A drilling fluid comprising a water-in-oil emulsion containing finely divided solids and as an emulsifying agent tall oil which has been subjected to the action of oxygen for such time and at such temperatures that its viscosity measured in centipoises at 200° F. has increased to between 125 and 250 percent of the original value and containing a quaternary amine in an amount sufficient to decrease the time and degree of agitation required for dispersion of the water in the oil of said water-in-oil emulsion drilling fluid and containing in an amount sufficient to stabilize said water-in-oil emulsion drilling fluid a compound capable of yielding calcium ion.

12. A drilling fluid comprising a water-in-oil emulsion containing finely divided solids and as an emulsifying agent tall oil which has been subjected to the action of oxygen for such time and at such temperatures that its viscosity measured in centipoises at 200° F. has increased to between 125 and 250 percent of the original value and containing a quaternary amine in an amount between about 0.1 and 1.0 pound per barrel of said water-in-oil emulsion drilling fluid and containing in an amount of at least 5 pounds per barrel of said water-in-oil emulsion drilling fluid a compound capable of yielding calcium ion.

13. A drilling fluid comprising a water-in-oil emulsion containing finely divided solids and as an emulsifying agent tall oil which has been subjected to the action of oxygen for such time and at such temperatures that its viscosity measured in centipoises at 200° F. has increased to between 125 and 250 percent of the original value and containing a quaternary amine in an amount between about 0.1 and 1.0 pound per barrel of said water-in-oil emulsion drilling fluid and containing lime in an amount of at least 5 pounds per barrel of said water-in-oil emulsion drilling fluid.

References Cited in the file of this patent
UNITED STATES PATENTS

| | | |
|---|---|---|
| 1,938,532 | Patch et al. | Dec. 5, 1933 |
| 2,509,588 | Dawson | May 30, 1950 |
| 2,539,975 | Spitzer et al. | Jan. 30, 1951 |
| 2,568,741 | Kirkpatrick et al. | Sept. 25, 1951 |
| 2,675,353 | Dawson | Apr. 13, 1954 |
| 2,702,787 | Freeland | Feb. 22, 1955 |